UNITED STATES PATENT OFFICE.

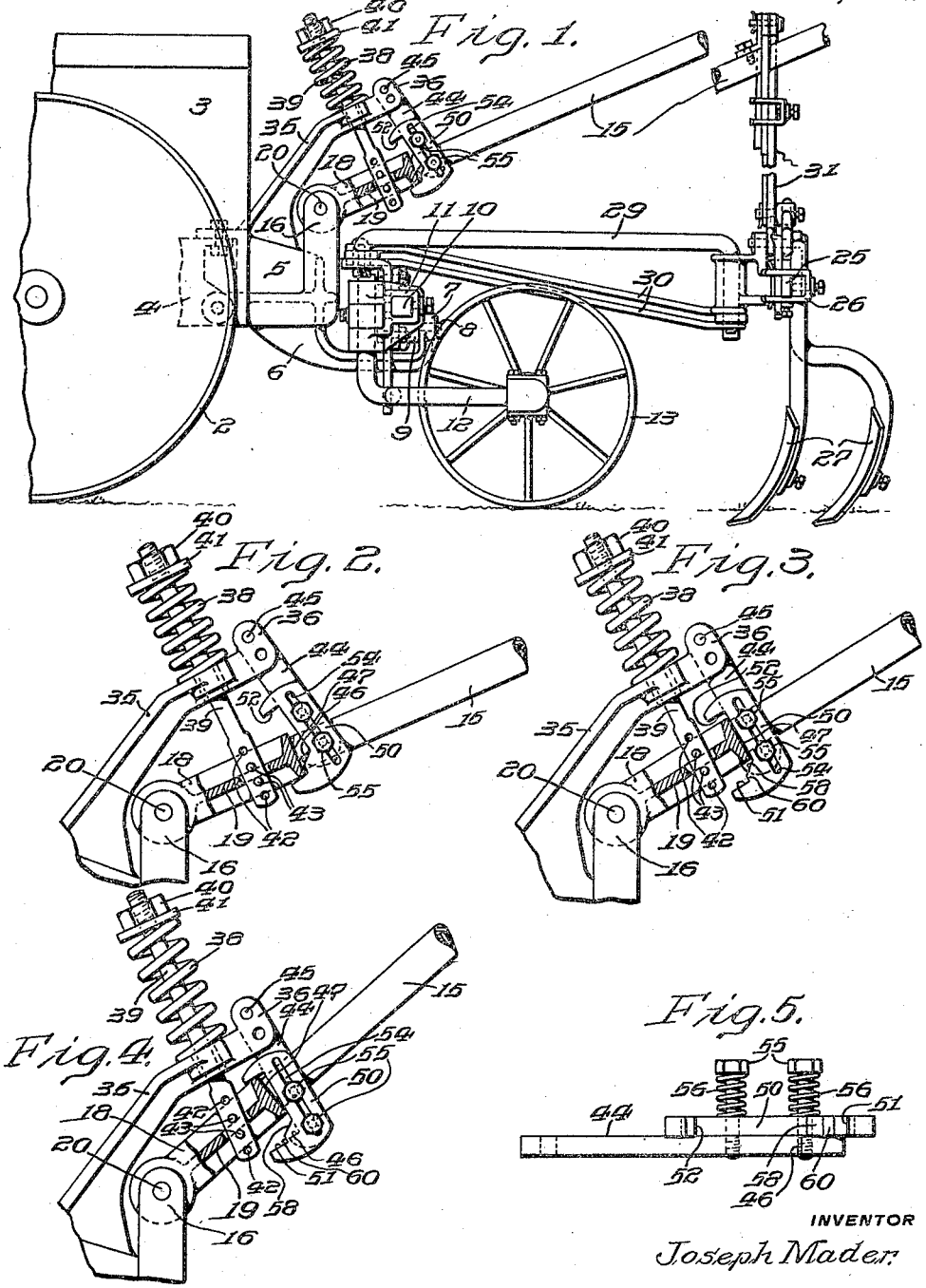

JOSEPH MADER, OF PHILADELPHIA, PENNSYLVANIA, ASSIGNOR TO S. L. ALLEN & CO., INC., A CORPORATION OF PENNSYLVANIA.

SUPPORT FOR TRACTOR STEERING-HANDLES.

1,398,301.	Specification of Letters Patent.	Patented Nov. 29, 1921.

Application filed June 9, 1920. Serial No. 387,524.

*To all whom it may concern:*

Be it known that I, JOSEPH MADER, a citizen of the United States, and a resident of the city of Philadelphia, county of Philadelphia, and State of Pennsylvania, have invented certain new and useful Improvements in Supports for Tractor Steering-Handles, of which the following is a specification, reference being had to the accompanying drawing.

The principal object of my invention is to provide means for conveniently supporting in raised position the steering handles of a garden tractor and the adjacent ground working implement if connected thereto.

Further objects of my invention are to provide means of the character aforesaid controlled solely by movement of the steering handles, so that the same will automatically operate to assume a position for supporting the handles when they are raised and from which position said means may be automatically released by a further upward movement of the handles to permit the latter to be lowered into normal position.

Still further objects of my invention are the provision of means suitable for effecting the aforesaid functions which are simple, comprise but a relatively small number of parts, which are not liable to get out of order, and which, without material modification of the design and construction of the ordinary types of garden tractors, may be readily associated therewith and embodied therein.

My invention further includes all of the other various objects and novel features of construction and arrangement hereinafter more definitely specified and described.

While for the purpose of accomplishing the functions and objects of my invention I may make use of any suitable instrumentalities and combinations thereof, I have shown in the accompanying drawing and will now proceed to describe a preferred embodiment of means adapted therefor, having illustrated the same in connection with a typical form of garden tractor and ground working implement connected therewith, only so much of the tractor and implement and their connections being shown as is requisite to obtaining an adequate comprehension of the invention, as it will be understood that the invention may be readily employed in connection with any ordinary type of garden tractor and that the same may be connected with any form of ground working implement or the like or may be utilized independently thereof if desired.

In the drawing, Figure 1 is a view in side elevation showing a portion of a typical graden tractor embodying my invention and having a ground working implement connected thereto, certain parts being broken away for the sake of clearness. Figs. 2, 3 and 4 are enlarged fragmentary views in side elevation and partial section showing the steering handles and adjacent parts in the positions respectively assumed when the steering handles are in normal position and in raised position, and also in the operation of disengaging the supporting means from the position shown in Fig. 3 preparatory to lowering the handles to the normal position shown in Fig. 2. Fig. 5 is a view in end elevation of certain details of the invention and on a still more enlarged scale.

Referring now more particularly to the drawing, the tractor fragmentarily shown therein comprises the supporting wheels 2 and hood 3 beneath which it will be understood is located the motor and suitable connections therefrom for rotating the wheels, the motor being supported on a suitable frame or housing 4 to which is rigidly secured in any suitable manner a rearwardly projecting casting 5.

The casting may be provided with a downwardly and rearwardly extending arm 6 directed upwardly at its outer extremity to provide a boss 7 for the reception of a pivot pin 8 secured in a boss 9 integral with a transversely extending sleeve through which passes the wheel bar 10 which also extends transversely of the machine and serves to preferably adjustably support brackets 11 which carry the substantially L-shaped caster wheel supports 12, at the rearmost extremities of which are rotatably mounted the caster wheels 13. A pair of preferably rearwardly diverging steering handles 15 is provided and arranged for vertical movement with respect to the casting 5 in any suitable manner. For this purpose the casting may be provided with a pair of laterally spaced, upwardly directed ears 16, between which is positioned a casting 18 comprising a pair of laterally spaced, rearwardly diverging sockets for the reception of the forward ends of the steering handles and a transversely extending web 19 extending between the sockets, the casting being rotatably supported on the ears 16 by a pivot pin 20 passing transversely through the ears and through the casting. The particular construction and arrangement of the various parts hitherto described, which may be modified as desired, as the same form no part of the present invention, will be readily comprehended by those familiar with the art and require no further description.

For the purpose of performing agricultural operations, the tractor is ordinarily employed with a suitable ground working implement which may comprise, for example, a transversely extending gang bar 25 to which are secured, as by clamps 26, a plurality of ground working tools 27, any suitable means being provided for effecting a draft connection between the wheel bar 10 and the implement. Said means may conveniently comprise draft rods 29, a link member 30, and suitable connections interposed between these parts and the wheel bar and gang bar, the arrangement and construction thereof being more fully described and claimed in an application for Letters Patent of the United States entitled Improvements in agricultural implements filed by me June 9, 1920, Serial No. 387,522, and as the same forms no part of the present invention further description thereof herein is omitted.

The ground working implement is ordinarily suitably supported from the steering handles 15, conveniently by means of hanger rods 31, and, if desired, means may be provided for effecting lateral shifting of the gang bar with respect to the tractor, for example, as described and claimed in a pending application for Letters Patent of the United States entitled Improvements in agricultural implements, Serial No. 368,842, filed March 26, 1920, by Charles J. Allen and Joseph Mader, said means and portions of the connections between the gang bar and steering handles being omitted from the drawing herein, since the same form no part of the present invention.

From the foregoing description, it will be therefore understood that the tractor may be used with a suitable ground working implement and that when so used the implement is drawn after the tractor and supported from the steering handles in such manner that when the latter are raised or lowered the implement will be correspondingly moved to vary the relation of the ground working tools with the soil, whereby the former may be withdrawn therefrom or entered therein as required.

For the purpose of normally yieldingly supporting the weight of the steering handles and their adjacent parts, suitable means may be provided conveniently comprising an upwardly and rearwardly extending bracket 35 preferably formed integral with the casting 5 and providing a lug 36 at its rearmost extremity. A portion of the bracket extends in a direction generally parallel to the normal position of the steering handles and provides a seat for the lower end of a coil spring 38 surrounding a rod 39 passing loosely through an aperture in the bracket and threaded at its upper end for the reception of a nut 40 bearing on a washer 41 interposed between the upper end of the spring and the nut. The lower end of the rod which is preferably flattened, extends through a suitable aperture in the web 19, and may preferably be provided with a plurality of spaced holes 42 adapted for the reception of a pair of pins 43 which are passed through the holes above and below the web so as to conveniently hold the rod in adjusted relation with respect thereto. It will be evident that by suitable adjustment of the nut 40 or, if necessary, by moving the pins from one set of holes to another, the tension of the spring may be so controlled as to afford an effective yielding support for the steering handles.

For supporting the handles and adjacent parts in raised position when it is desired to hold the ground working tools 27 out of engagement with the soil, suitable means are provided comprising, in the form of the invention shown, an arm 44 pivoted adjacent its upper extremity to the bracket 35 on a pivot 45 so as to swing freely with respect thereto on a horizontal axis and having a shoulder 46 formed adjacent its lower end adapted to engage with a suitable portion of the casting 18 which may conveniently take the form of a transversely extending flange 47 positioned substantially at right angles to the web 19 adjacent the rear end of the casting.

Supported on and in longitudinally slidable relation with the arm 44 is a slide 50 preferably formed of flat metal and provided with a pair of oppositely disposed laterally directed lugs adjacent its upper and lower extremities, the inner or opposed faces of which form surfaces 51 and 52 extending substantially at right angles to the general direction of the body of the slide and of the arm. The slide is also provided with a longitudinally extending slot 54 through which extends a pair of headed guide pins 55 threaded into or otherwise preferably adjustably secured to the arm, and each of which is surrounded by a compression coil spring 56, as best shown in Fig. 5, which serve to hold the slide in frictional engagement with the arm but permit its longitudinal movement with respect thereto under certain conditions of operation. The slide is also provided with a surface 58 extending diagonally from the inner edge of the body of the slide to a point slightly above the surface 51 so that the latter terminates in a shoulder or stop 60 substantially normal to the surface 51 and disposed between it and the diagonal surface 58. The surface 58 is so positioned that when the slide is moved upwardly along the arm to approximately the limit of its travel in that direction, it will assume a position above the shoulder 46 and the slide will overlap the latter as best shown in Fig. 4, whereas when the slide is moved in the opposite direction along the arm for a suitable distance, the surface 58 will move below the shoulder and uncover the same, as best shown in Fig. 3.

With the parts constructed and arranged substantially as hereinbefore described, the operation of the invention will now be briefly explained: With the handles in their normal position, that is, as shown in Figs. 1 and 2, and the ground working tools in operative position, the arm and slide, through contact with flange 47, assume substantially the position shown in those figures, that is, with the slide toward its lowermost point of travel with respect to the arm, and the outer corner of the shoulder of the latter as well as stop 60 resting adjacent or against the face or surface of the flange. If now it is desired to support the handles in raised position, the latter are moved upwardly about the pivot 20 until the lower edge of flange 47 is above the surface of the shoulder 46, during which movement the arm and slide under the action of gravity swing downwardly about the pivot 45 until the shoulder moves beneath the flange and thus to a position to support the handles in raised position, the various parts assuming the relation shown in Fig. 3. When it is desired to disengage the supporting means from the flange preparatory to lowering the handles again to normal position, the handles are first moved upwardly from the position of Fig. 3 substantially to the position shown in Fig. 4, during which movement the upper edge of the flange is brought into engagement with the surface 52, which serves to move the slide upwardly along the arm thereby covering the shoulder 46, the arm meanwhile remaining substantially stationary owing to its generally tangential direction to the arc described by the flange. The movement of the handles is now reversed, and as the lower edge of the flange comes into engagement with the surface 58 it rides thereon and swings the arm and slide outwardly as a unit about pivot 45, no relative movement up to this point taking place between the arm and the slide by reason of their frictional engagement, so that the shoulder 46 is prevented from engaging the flange during the downward movement of the latter. When, however, the lower edge of the flange engages surface 52 during the downward movement of the handles, the further movement thereof is effective to positively move the slide downwardly on the arm until the shoulder 46 is again exposed prior to the time when the handles have reached their lowermost or normal position, and the parts are thus automatically reset in their original relation. It will thus be evident that the operation of the supporting means is controlled solely through the movement of the handles and automatically functions to support the handles in raised position as the same are brought thereto; that said means may be conveniently and automatically released from supporting position by a simple upward movement of the handles and are automatically reset while the handles are being lowered to normal position.

While I have herein referred to a preferred embodiment of my invention with considerable particularity, I do not thereby desire or intend to limit myself to the precise details of construction and arrangement of the various parts which I have shown and described, as suitable modifications may be made therein as desired and the invention embodied in tractors or other machinery of varying types without departing from the spirit and scope of the invention as defined in the appended claims.

Having thus described my invention, I claim and desire to protect by Letters Patent of the United States:

1. The combination with a machine of the class described having a frame and a handle vertically movable with respect thereto, of means for supporting said handle in normal position, means for supporting said handle in raised position comprising a pivoted arm having a shoulder adapted to engage a member movable with said handle, and means longitudinally slidable on said arm adapted to render said shoulder inoperative to engage said member and operable by an upward movement of said handle from its supported position.

2. The combination with a machine of the class described having a frame and a handle vertically movable with respect thereto, of means for supporting said handle in normal position, means for supporting said handle in raised position comprising a pivoted arm having a shoulder adapted to engage a member movable with said handle, and means comprising a slide relatively longitudinally slidable with respect to said arm and operative on an upward movement of said handle from its raised position to render said shoulder inoperative to engage said member during a downward movement of said handle to normal position.

3. The combination with a machine of the class described having a frame, a pair of handles relatively vertically movable with respect thereto and a member movable therewith, means operative to yieldingly support said handles in normal position, means operative to support said handles in raised position comprising a pivoted arm having a shoulder adapted to engage a member movable with said handles, and a slide carried by and longitudinally movable with respect to said arm and having a pair of opposed surfaces adjacent said member, said slide being operative to move longitudinally on said arm through contact of said member with said opposed surfaces to expose said shoulder when moved in one direction to permit it to engage said member and to cover said shoulder when moved in the opposite direction thereon to prevent it from engaging said member.

4. The combination with a machine of the class described having a frame and a pair of vertically movable handles, of means for supporting said handles in raised position when moved thereto, said means comprising a lever having a shoulder adapted to engage a member movable with said handles, and means for rendering said shoulder inoperative to engage said member and comprising a slide longitudinally slidable on said lever and having a diagonally disposed surface adjacent said shoulder, and means for moving said slide along the lever through contact with said member to a position in which said slide covers said shoulder and said diagonal surface is presented for engagement by said member.

5. The combination with a machine of the class described having a frame, a handle vertically movable with respect thereto and a member movable with said handle, of means for supporting said handle in normal position, means for supporting said handle in raised position comprising a pivoted arm having a shoulder adapted to engage said member, a slide in frictional engagement with said arm and movable both therewith and relatively longitudinally thereto, said slide being adapted for longitudinal movement on said arm in one direction through contact with said member and in correspondence with the movement of the handle to a position to cover said shoulder and for movement in the opposite direction to expose said shoulder.

6. The combination with a machine of the class described having a frame, a handle relatively movable thereto and a member movable with said handle, of means for automatically engaging said member when said handle is moved to a raised position and comprising a pivoted arm, and a slide carried thereby and relatively longitudinally movable with respect thereto, said slide when in lowermost position on said arm being operative to permit said arm to engage said member and when in uppermost position thereon to prevent its engagement therewith, the position of said slide with respect to said arm being automatically controlled through the movement of said handle.

7. The combination with a machine of the class described having a frame, a vertically movable handle and a member movable therewith, of means for supporting said handle in raised position comprising an arm having a shoulder adapted to engage said member, a slide carried by said arm longitudinally movable thereon and in frictional engagement therewith, said slide comprising spaced opposed surfaces adapted for engagement by said member and a diagonally disposed surface on which said member is adapted to ride, the position of said slide on said arm being controlled by the position of the handle whereby when said handle is raised to a predetermined point the slide is moved to cover said shoulder and prevent said diagonal surface from engagement by said member and when said handle is lowered in the opposite direction said slide is moved to a position to uncover said shoulder to permit its engagement with said member.

In witness whereof, I have hereunto set my hand this 7th day of June, 1920.

JOSEPH MADER.